(12) United States Patent
Tong et al.

(10) Patent No.: US 8,730,568 B2
(45) Date of Patent: May 20, 2014

(54) GENERATING LASER PULSES BASED ON CHIRPED PULSE AMPLIFICATION

(75) Inventors: Sha Tong, Mountain View, CA (US);
Jerry Prawiharjo, Sunnyvale, CA (US);
Hong Cong, Sunnyvale, CA (US);
Daniel Beom Soo Soh, Pleasanton, CA (US); Lawrence C. West, San Jose, CA (US); Anthony Hong Lin, Palo Alto, CA (US)

(73) Assignee: Calmar Optcom, Inc., Sunnyvale, CA (US)

( * ) Notice: Subject to any disclaimer, the term of this patent is extended or adjusted under 35 U.S.C. 154(b) by 736 days.

(21) Appl. No.: 12/881,146

(22) Filed: Sep. 13, 2010

(65) Prior Publication Data

US 2012/0062984 A1 Mar. 15, 2012

(51) Int. Cl.
*H01S 3/23* (2006.01)
*H01S 3/16* (2006.01)

(52) U.S. Cl.
USPC .......................................... 359/333; 359/337.4

(58) Field of Classification Search
USPC ............................................. 359/333, 337.4
See application file for complete search history.

(56) References Cited

U.S. PATENT DOCUMENTS

| 5,499,134 | A | 3/1996 | Galvanauskas et al. |
| 5,696,782 | A | 12/1997 | Harter et al. |
| 5,847,863 | A | 12/1998 | Galvanauskas et al. |
| 7,113,327 | B2 | 9/2006 | Gu et al. |
| 7,782,912 | B2 * | 8/2010 | Harter et al. ...................... 372/6 |
| 8,228,597 | B2 | 7/2012 | Fermann et al. |
| 8,353,899 | B1 | 1/2013 | Wells et al. |
| 8,532,150 | B1 | 9/2013 | Tong et al. |
| 8,537,866 | B2 | 9/2013 | Lin |
| 2003/0112494 | A1 | 6/2003 | Barty et al. |
| 2005/0041702 | A1 | 2/2005 | Fermann et al. |
| 2009/0046352 | A1 * | 2/2009 | Brunet et al. ................. 359/333 |
| 2010/0189392 | A1 | 7/2010 | Rockwell et al. |
| 2011/0211598 | A1 | 9/2011 | Liu et al. |
| 2011/0249321 | A1 | 10/2011 | Savage-Leuchs et al. |
| 2012/0062984 | A1 | 3/2012 | Tong et al. |

FOREIGN PATENT DOCUMENTS

WO    2005094275 A2    10/2005

OTHER PUBLICATIONS

Banks, P.S., et al., "Novel All-Reflective Stretcher for Chirped-Pulse Amplification of Ultrashort Pulses," IEEE Journal of Quantum Electronics, vol. 36(3):268-274, Mar. 2000.

Zhou, Yue, et al., "All-Fiber-Based Ultrashort Pulse Generation and Chirped Pulse Amplification Through Parametric Processes," IEEE Photonics Technology Letters, vol. 22(17):1330-1332, Sep. 1, 2010.

* cited by examiner

*Primary Examiner* — Mark Hellner

(74) *Attorney, Agent, or Firm* — Perkins Coie LLP

(57) ABSTRACT

Techniques and devices for producing short laser pulses based on chirped pulse amplification.

33 Claims, 14 Drawing Sheets

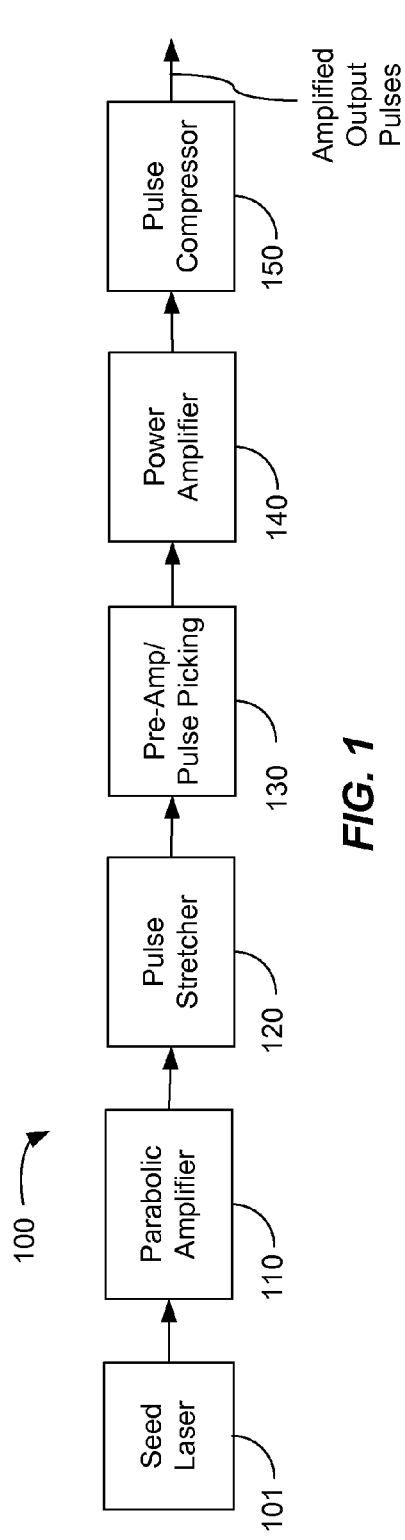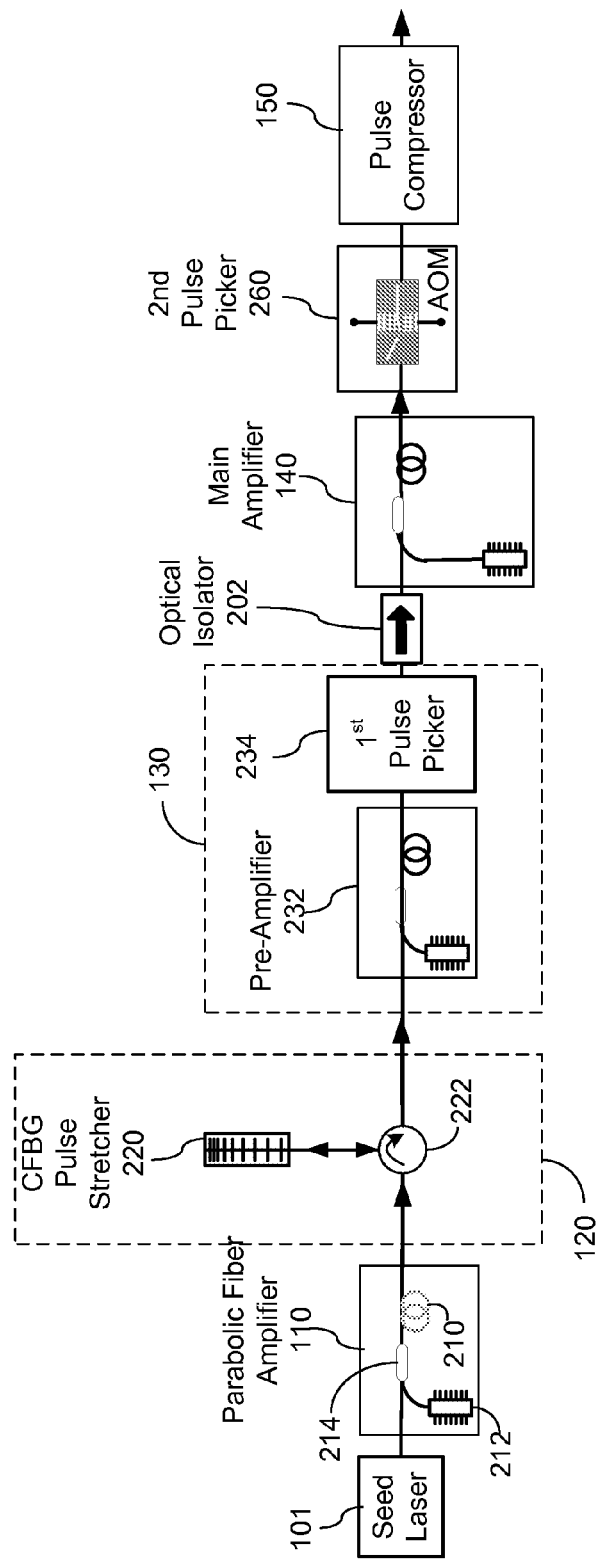

GENERATING LASER PULSES BASED ON CHIRPED PULSE AMPLIFICATION

BACKGROUND

This document relates to generation and control of laser pulses, including optical pulse amplifiers and pulse lasers.

Ultra short pulsed (USP) lasers with a pulse length less than 1-10 picoseconds are attractive for a wide range of applications such as material processing, optical sensing, optical ablation, precision surgery including ophthalmology, biomedical, nonlinear studies and spectroscopy. In some of these and other applications, the laser pulses may be required to have sufficient pulse energy.

High energy laser pulses can be generated by amplifying laser pulses generated by a seed laser. Various optical amplifiers are designed to amplify light by providing an optical gain at the same wavelength of the light to be amplified so that the light, after transmitting through an optical gain medium of the optical amplifier, is amplified in its power or energy and the amplified light is at the same wavelength of the original light prior to the amplification. The optical gain of the optical amplifier can be obtained by pump light that optically excites the optical gain medium such as a Nd or Yb doped fiber amplifier, or by an electrically energized gain medium such as a semiconductor optical amplifier based on quantum wells and other gain mechanisms.

SUMMARY

This document describes techniques and devices for producing short laser pulses based on chirped pulse amplification.

In one aspect, a method for amplifying laser pulses is provided to include operating an input optical amplifier to amplify input laser pulses to produce laser pulses that have a linear chirp in frequency and are stretched to have a pulse duration longer than a pulse duration of each input laser pulse; operating an optical pulse stretcher down stream from the initial optical amplifier to further stretch durations of the laser pulses to produce stretched laser pulses that have a reduced peak power in each laser pulse; directing the stretched laser pulses into an optical amplifier to amplify the stretched laser pulses to produce amplified stretched laser pulses; and compressing a pulse duration of each of amplified stretched laser pulses to produce amplified and compressed output laser pulses with a high peak power.

In another aspect, a pulsed laser device is provided to include a pulsed seed laser that produces input laser pulses; an initial optical amplifier that receives the input laser pulses to amplify the received input laser pulses to produce laser pulses that have a linear chirp in frequency and a pulse duration longer than a pulse duration of each input laser pulse; an optical pulse stretcher located down stream from the initial optical amplifier to further stretch durations of the laser pulses to produce stretched laser pulses that have a reduced peak power; an optical amplifier to further amplify the stretched laser pulses to produce amplified stretched laser pulses; and a pulse compressor that compresses a pulse duration of each pulse in the amplified stretched laser pulses to produce amplified and compressed output laser pulses with a high peak power.

In another aspect, a pulsed laser device is provided to include a pulsed seed laser that produces input laser pulses; an optical pulse stretcher located down stream from the seed laser to stretch durations of the laser pulses originated from the input laser pulses to produce stretched laser pulses that have a reduced peak power; an optical amplifier located down stream from the optical pulse stretcher to receive the stretched laser pulses and to amplify the stretched laser pulses to produce amplified stretched laser pulses; a pulse compressor that is located down stream from the optical amplifier and compresses a pulse duration of each received laser pulse to produce a compressed laser pulse with a high peak power; and a pulse picking device located between the optical pulse stretcher and the pulse compressor and to reduce a pulse repetition rate of received laser pulses, the pulse picking device including an acousto-optic modulator that receives input light to produce a diffraction beam along a direction different from a direction of the input light, and a prism located to receive the diffraction beam to produce output light.

In another aspect, a method for amplifying laser pulses is provided to include operating a parabolic optical amplifier to amplify input laser pulses at an input pulse repetition rate to produce parabolic laser pulses that have a parabolic pulse and spectral shape and are stretched to have a pulse duration longer than a pulse duration of each input laser pulse; operating an optical pulse stretcher down stream from the parabolic optical amplifier to further stretch durations of the parabolic laser pulses to produce stretched parabolic laser pulses that have a reduced peak power; directing the stretched parabolic laser pulses into a first optical amplifier to amplify the stretched parabolic laser pulses to produce first amplified stretched laser pulses; directing the first amplified stretched laser pulses into a second optical amplifier to further amplify the first amplified stretched laser pulses to produce second amplified stretched laser pulses; and compressing a pulse duration of each pulse in the second amplified stretched laser pulses to produce amplified and compressed output laser pulses with a high peak power.

In yet another aspect, a pulsed laser device is provided to include a pulsed seed laser that produces input laser pulses; an optical parabolic amplifier that receives the input laser pulses to amplify the received input laser pulses to produce parabolic laser pulses that have a parabolic pulse and spectral shape and are stretched to have a pulse duration longer than a pulse duration of each input laser pulse; an optical pulse stretcher located down stream from the parabolic optical amplifier to further stretch durations of the parabolic laser pulses to produce stretched parabolic laser pulses that have a reduced peak power; a first optical amplifier located down stream from the optical pulse stretcher to receive the stretched parabolic laser pulses and to amplify the stretched parabolic laser pulses to produce first amplified stretched laser pulses; a second optical amplifier to further amplify the first amplified stretched laser pulses to produce second amplified stretched laser pulses; and a pulse compressor that compresses a pulse duration of each pulse in the second amplified stretched laser pulses to produce amplified and compressed output laser pulses with a high peak power.

These and other aspects, their implementations and other features are described in detail in the drawings, the description and the claims.

BRIEF DESCRIPTION OF THE DRAWINGS

FIG. 1 shows one example of a pulsed laser based on chirped pulse amplification.

FIG. 2 shows an example of a pulsed laser based on the design in FIG. 1.

FIGS. 3A-1, 3A-2, 3B-1, 3B-2, 4A and 4B show examples of laser spectral measurements of output of an optical parabolic amplifier with various distortions in the input pulses.

DETAILED DESCRIPTION

Figures 1, 3A:
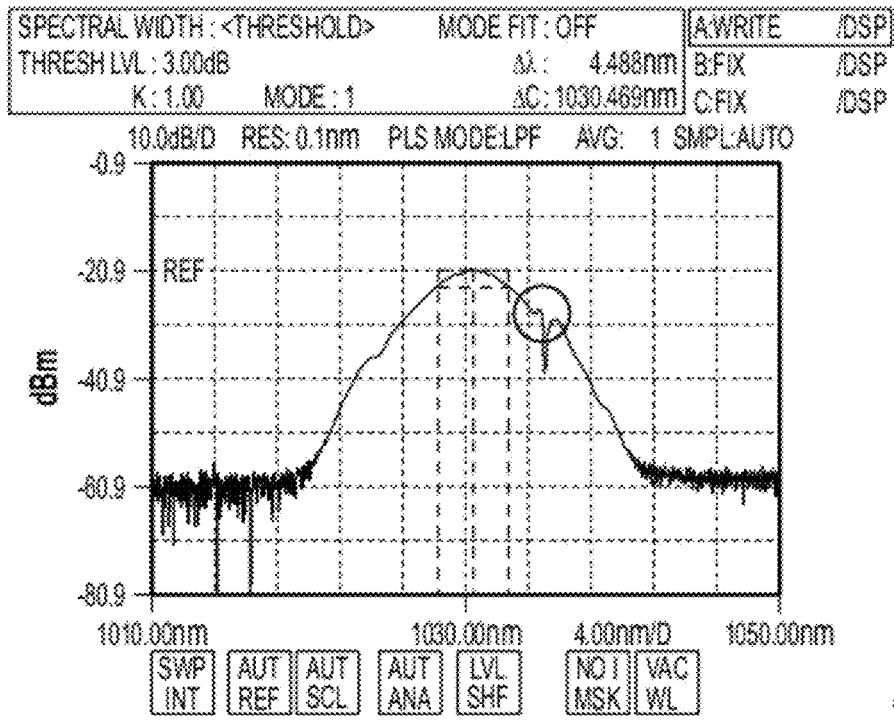

The pulse energy of a laser pulse can be estimated by the product of the pulse length and the pulse peak power. Short pulses at a given pulse energy can have high peak power. For example, a pulse with a pulse energy of 10-100 microJ and a pulse width of 1 psec has a peak power of 10-100 MWatt. The high peak power due to a short pulse duration can be desirable in various applications. When the pulse with high peak power is focused into a small spot, the electric field strength is sufficient to affect the electrons in the material thereby creating plasma effects. This plasma effect permits for example removal of material without creating thermal effects—a process referred to as cold ablation. By comparison, some lasers with longer pulse lengths in contrast remove material through a heat creating substantial heat affected zones with distorted material around the area.

The high electric field due to the high peak power in USP lasers make construction of a UPS laser difficult since the ablation effects could also damage the laser or create distortions in the laser as the laser pulse interactions with the gain material of the laser and other optical elements of the laser. One of common contributors to optical distortions is nonlinear optical effects. For example, stimulated Raman Scattering (SRS) is a non-linear optical interaction of light and optical phonon in the material when the intensity of light at an optical wavelength exceeds a SRS threshold. When SRS occurs, a Raman signal is generated in the same propagation direction of the original light by the non-linear SRS process in the medium at a Raman frequency that is shifted from the optical frequency of the original light by a Raman frequency detuning. The SRS can lead to undesired effects in optical pulse amplification in fibers and other optical media. For example, as the intensity of the optical pulses increases to reach the SRS threshold level, the optical power in the optical pulses is depleted and thus the SRS process puts an upper limit to the optical power of the optical pulses. Also, optical nonlinear effects such as self-phase modulation (SPM) based on Kerr effect can accumulate as the pulses propagate and SPM usually generate new spectral components and nonlinear chirp, making it difficult to obtain short pulses which are desirable in various pulsed laser applications, such as laser material processing and other applications.

Therefore, optical pulse amplification techniques and devices described in this document first stretch the optical pulses in the time domain to reduce the pulse peak power (e.g., under the SRS threshold) and to mitigate distortions such as the accumulation of the optical nonlinear effects during the optical amplification process. The pulses can be stretched in time by a desired factor (e.g., 100 or more) to reduce the peak power by the same factor. After amplification of the stretched optical pulses, the amplified optical pulses are then compressed in time to produce desired short optical pulses. This pulse amplification process is known as the chirped pulse amplification (CPA). The stretching and compression of the pulse are based on delaying different wavelengths in the pulse by different amount of time. An ultra short pulse by its nature has a wide spectrum of 1-10 nm or more. In the stretcher, the short wavelength pulses may be delayed with respect to the long wavelength pulses or vise versa and, in the compressor, this effect is undone again.

The parabolic pulse amplification uses the normal dispersion in optical fibers in combination with a positive gain in the fiber amplifier to produce a linearly chirped stretched optical pulse. In an ideal parabolic amplifier with an infinite gain band width and an infinite fiber length, the output pulse width and spectrum broaden and the pulse has a parabolic shape that is independent of the input energy and the shape of the input pulses. In practical parabolic amplifiers, however, the gain bandwidth and finite fiber length are finite and limited, parabolic output pulses may be obtained depending on a number of conditions of the input pulse, including spectral distortions, input power and the amount of broadening of the input spectrum with respect to the bandwidth of the gain medium of the amplifier. The output pulse shape is approximately parabolic. Therefore, the parabolic amplifier can be used in the present chirped pulse amplification to obtain amplified and stretched parabolic pulses. The stretched parabolic pulses can be subsequently compressed to produce short and high power pulses.

FIG. 1 shows an example of a pulsed laser based on CPA and parabolic amplification. The pulsed laser device 100 includes a pulsed seed laser 101 that produces input laser pulses. An optical parabolic amplifier 110 is provided down stream from the seed laser 101 to receive the input laser pulses to amplify the received input laser pulses to produce parabolic laser pulses. Parabolic pulses have a parabolic pulse and spectral shape. The output pulses from the parabolic amplifier 110, due to the practical device limitations, may not be ideal parabolic pulses and may have an approximately parabolic pulse shape. The amplifier 110 is an initial amplifier that is designed to cause pulse broadening by the amplification process so that a pulse duration of the output laser pulse is longer than a pulse duration of the input laser pulse and the output laser pulse has a linear chirp in the frequency or phase. The amplifier 110 is referred to as a "parabolic amplifier" in examples below for convenience although the actual amplifier 110 in implementation may not be an ideal parabolic amplifier. Accordingly, the output pulses from the initial amplifier 110 are referred to as "parabolic pulses" in the examples although such pulses may not be ideal parabolic pulses.

In FIG. 1, an optical pulse stretcher 120 is located down stream from the parabolic optical amplifier 110 to further stretch durations of the parabolic laser pulses to produce stretched parabolic laser pulses that have a reduced peak power. The amount of stretching in the pulse duration can be a factor of 10 or more than the initially stretched pulse duration by the initial amplifier 110. In this example, a pre optical amplifier 130 is provided to receive the stretched parabolic laser pulses and to amplify the stretched parabolic laser pulses to produce first amplified stretched parabolic laser pulses. Next, a second optical amplifier 140 is provided to act as the main amplifier to further amplify the first amplified stretched parabolic laser pulses to produce second amplified stretched parabolic laser pulses. In some implementations, the pre optical amplifier 130 may be eliminated so the stretched laser pulses are fed directly into the optical amplifier 140 for amplification. A pulse picking function can be included before the main amplifier 140 to reduce the original pulse repetition rate in the seed laser pulses. In some implementations, a pulse picker device may be inserted between the optical pulse stretcher 120 and the optical amplifier 140, e.g., between the pre-amplifier 130 and the main amplifier 140, to reduce the number of pulses or the pulse repetition rate. This pulse picker device may be provided in implementations where the pre optical amplifier 130 is eliminated.

This device 100 also includes a pulse compressor 150 that compresses a pulse duration of each pulse in the second amplified stretched parabolic laser pulses to produce amplified and compressed output laser pulses with a high peak power. In some implementations, the amplified and compressed output laser pulses can have a pulse energy greater than 10 micro joules and/or a pulse duration less than 10 picoseconds. These and other short and high power pulses produced by the device in FIG. 1 can be used in a wide range of applications.

The pulse compressor 150 can be implemented in various configurations. One example of the pulse compressor 150 is a pair of gratings where a pulse is directed through the two gratings to achieve the pulse compression. The first grating creates an angular dispersion, which is undone by the second grating. Different diffraction spectral components produced by the first grating are diffracted at different diffraction angles between the two gratings and propagate along different propagating lengths between the two gratings to undergo a strong dispersion. For proper pulse compression, it is important to not only consider dispersion properties of the stretcher and compressor but also take into account higher order dispersion terms as well as other components in the laser to minimize pulse distortions.

The wavelength of the laser light from the seed laser 101 can be in various wavelengths, such as within the spectral band of Er, Er/Yb fibers around 1.55 μm, Yb fibers around 1 μm, Ho fibers around 2 μm or other rare earth element doped fiber gain bands. The laser power of the laser 101 can be in various ranges. The parabolic amplifier 110 can be used to achieve both high energy and linearly chirped output. The output of the parabolic fiber amplifier 110 can be insensitive to the parameters of input pulses and this property can improve the stability of the device 100.

Figures 2, 3A:
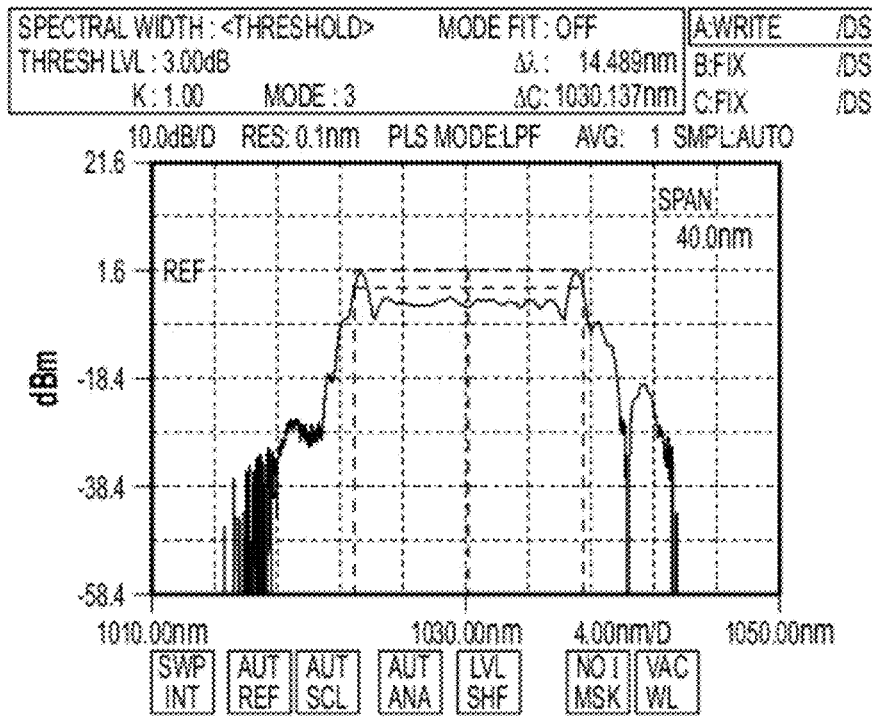

FIG. 2 shows an exemplary implementation of the laser in FIG. 1. The parabolic amplifier 110 in this example includes a pump light source 212 and a fiber coupler 214 that couples the pump light from the pump light source 212 into the main fiber path of the laser 100. The fiber gain section 210 is optically pumped by the pump light to produce the optical gain for the parabolic amplification. In this example, the pump light is coupled into the fiber gain section 210 in the same propagation direction as the laser pulses from the seed laser 101. A laser pulse propagating through the parabolic amplifier 110 is stretched and its spectrum is broadened. The output pulse from the amplifier has an approximate parabolic pulse and spectral shape. The output is then fed into the pulse stretcher 120.

In this example, the pulse stretcher 120 includes a chirped fiber Bragg grating (CFBG) where the grating period along the fiber is spatially chirped. The CFBG further stretches the pulse to lower the peak power levels and permits further amplification without distortions due to SPM, while retaining the parabolic pulse shape. An optical circulator 222 is provided to direct the input light from the parabolic amplifier 110 into the CFBG pulse stretcher 220 and direct the reflected light to the main fiber line of the laser 100. In this design, laser pulses transmit through the CFBG stretcher 220 twice. The output from the optical circulator 222 may be injected into an optional amplifier (fiber pre-amplifier) 232 to increase the average power to a suitable level for injection into a main power amplifier 140. Additional amplifiers may be used as needed. Since the pulse is stretched, no substantial SPM effects occur in these pre-amplifiers.

As an option in some applications, a pulse picker 234 can be placed in between the pre amplifier 232 and the main amplifier 140. The pulse picker 234 modifies or reduces the pulse repetition rate to a lower rate by picking pulses to produce modified pulses at a lower pulse repetition rate. One example of a pulse picker 234 is an Acoustic Optical (AO) modulator or an Electro Optical (EO) modulator. Such a modulator is driven by an electrical gating signal to pick pulses from pulses generated by the seed laser 101. As such, the pulse picker 234 reduces the number of pulses for further amplification. This allows a higher energy per pulse to be achieved. The pulse picker 234 is not used in devices where the seed laser 101 produces pulses at a desirable pulse repetition rate.

The pulse picker 234 before the main power amplifier 140 can be used to adjust the pulse repetition rate of the pulses at any desired rate. However, this would change the average input signal to the main power amplifier 140 and thus can create large changes and possible instabilities in the power amplifier 140. At low repetition rates less than a threshold rate, e.g., 10 kHz, the amplifier gain between pulses could create significant amplified spontaneous emission (ASE) and can cause self lasing of the amplifier due to, e.g., residual reflections.

Therefore, in order to provide a better control over the pulse repetition rate of the pulses of the laser 100, a second pulse picker 260 is placed after the power amplifier 140. The operation of the second pulse picker 260 will not affect the operation of the main amplifier 140 and thus can be used to set the repetition rate at a wide range of rates to meet the requirements of respective applications. This two stage pulse picking can have certain advantages in providing variable pulse repetition rates.

Different types of pulse pickers can be used. Coupling a pulse picker via fiber coupling introduces fiber pigtails that can create large distortions at high peak powers. An electro-optic (EO) modulator or acousto optic (AO) modulator can be used to provide optical modulation for pulse picking by reducing the number of pulses. Various EO modulators operate at high voltages and are therefore less suitable. An AO modulator can be operated at lower voltages and deflect the beam based on an applied RF signal to the AO crystal. The zero order beam out of the AO crystal can be used to modulate the output. In various AO modulators, only around 90% of the light may be deflected in the zero order beam and therefore using the zero order beam can lead to a series of smaller pulses around the selected pulses due to insufficient blocking of those smaller pulses. Using the $1^{st}$ order beam circumvents this problem.

In FIG. 2, the optical power amplifier 140 can be implemented in various configurations. Some examples are a core pump fiber amplifier, a double clad fiber amplifier, a combination of a core pump fiber amplifier and a double clad fiber amplifier, and other amplifier designs such as solid state laser amplifiers. A solid state laser gain medium can be optically pumped by, e.g., diode lasers or flash light pump. In various amplifier designs, solid state laser amplifiers can be used to provide the last stage amplification in a multi-stage amplifier design due to their large cross sections. Exemplary materials used for solid state amplifiers include Nd:YAG, Nd:YLF, Nd:glass, and others.

While the pulse length of the seed laser 101 may not be critical, the pulse shape should be well controlled. For an ideal parabolic amplifier the pulse shape does not matter as it has been shown theoretically that the output from the amplifier only depends on the pulse energy. In practical parabolic amplifiers the fiber length and gain bandwidth are limited. In such practical amplifiers distortions in the input pulse can create strong distortions in the output pulse.

Figures 1, 3B:
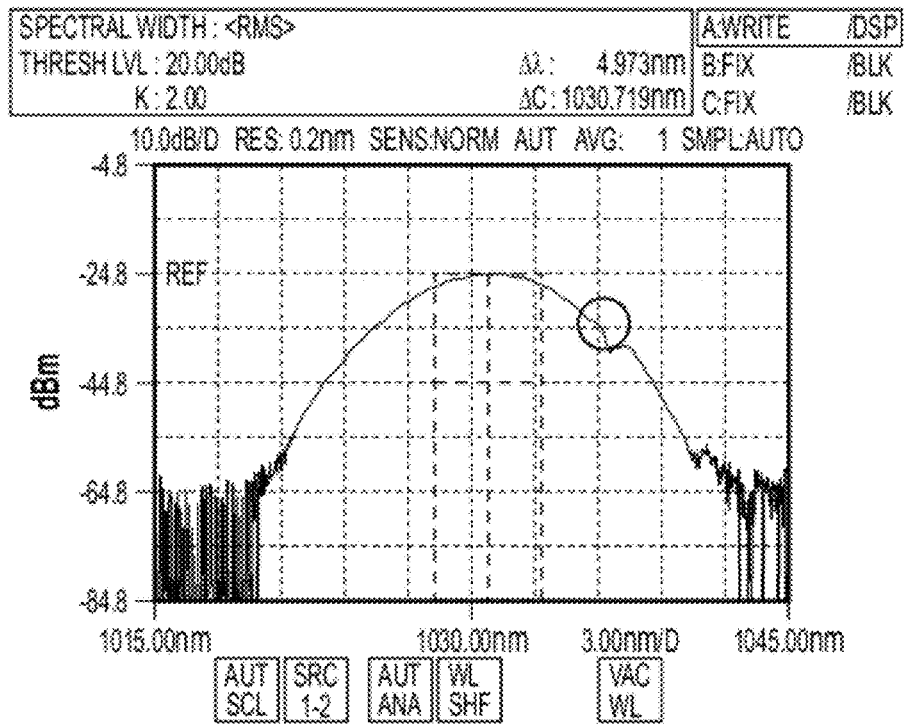
Figures 2, 3B:
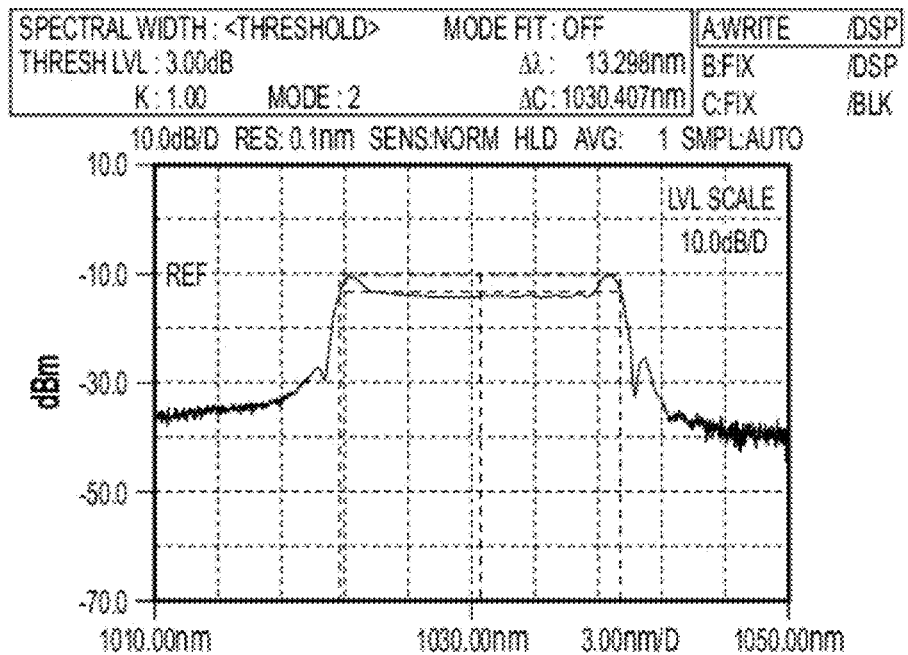

FIGS. 3A-1 and 3A-2 illustrate distortions in the output of the parabolic amplifier. The input spectrum, shown in FIG. 3A-1, has a 10 dB dip near the right of the peak of the input spectrum. Such a dip may occur in pump seed lasers. For instance, soliton based pulsed lasers typically have a dispersive wave that may create a small pulse near the main pulse. This pulse, when in close proximity to the main pulse, can create spectral distortions in the seed source. Other types of lasers or components following the laser may create other types of distortions. The measured output spectrum from the parabolic amplifier, shown in FIG. 3A-2 shows a strong ripple rather than a clean smooth output spectrum. To create a smooth output spectrum and pulse from a practical parabolic amplifier it was determined that a secondary pulse creates less than 10 to 15 dB distortions in the spectrum. The measured input spectra from the seed source with more than 10 dB distortion is shown in FIGS. 3B-1. The measured output spectrum of the parabolic amplifier, shown in FIG. 3B-2, does not show a strong ripple. A clean output spectrum from the parabolic amplifier may also be obtained for spectral distortion outside the bandwidth of the main pulse.

Figure 4A:
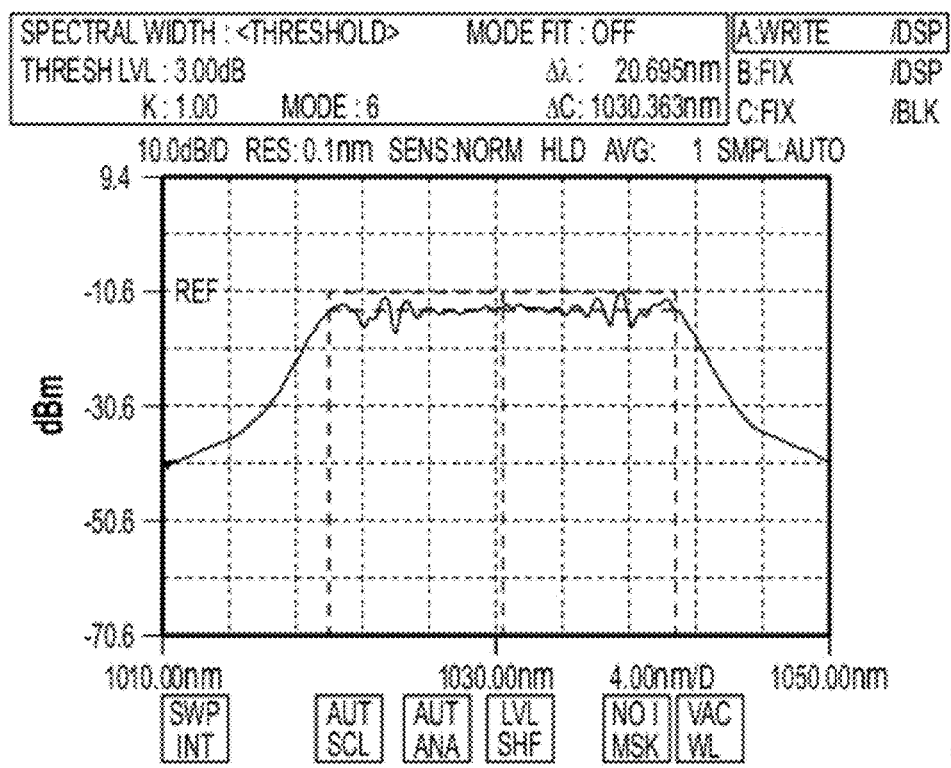
Figure 4B:
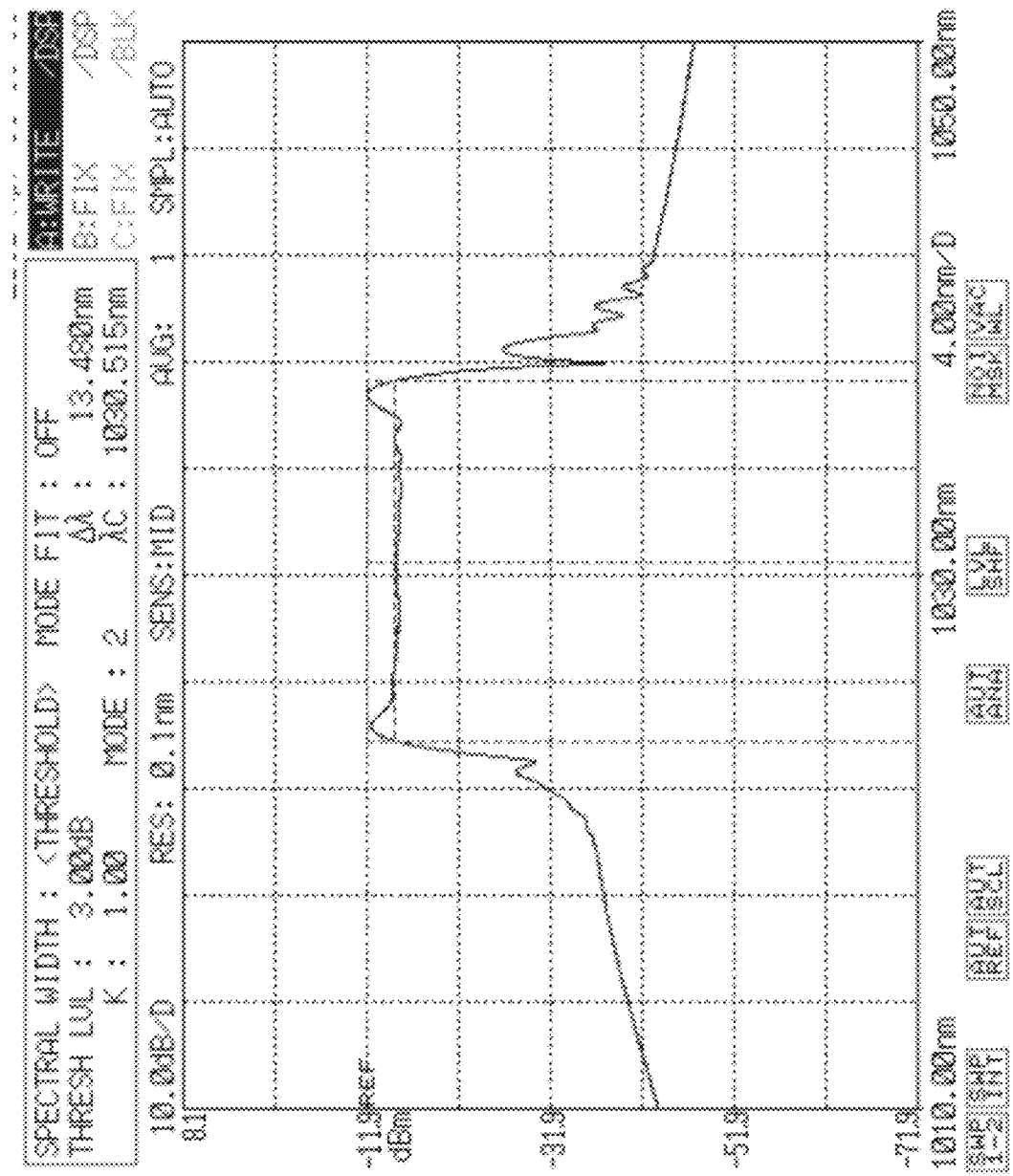

Practical parabolic amplifiers are sensitive to the input pulse energy and peak power. FIGS. 4A and 4B show measured input pulse spectra at 30 Watts and 4 Watts for peak power levels, respectively. The results show substantial distortions for the 30-Watt peak power pulse while distortions for the 4-Watt peak power pulse are small. Pulse distortions can be caused by the high pulse peak power due to various mechanisms. For example, small residual distortions in the seed laser source can cause further distortions in the parabolic amplifier at a high input power which generates significant nonlinearities and causes interference between residual distortions and the signal pulse. To keep the output distortion small, the spectrum broadening should be controlled less than a desired level, e.g., less than the spectral distance between the signal pulse and the residual distortions. At high peak power levels that cause the pulse to quickly broaden its spectrum to a width comparable to the gain band width of the gain medium, the amplifier interactions no longer provide the balance among the gain, dispersion and nonlinear interaction which supports a similariton and the pulse starts to distort. For small distortions, the spectrum along the amplifier should be less than the bandwidth of the gain medium. In some implementations, the gain in the fiber should vary less than 3 dB over the band width of the pulse at locations along the length of the fiber. For example in Yb, this bandwidth is around 30 nm at 1030 nm. To obtain a clean output pulse from the parabolic amplifier with practical input distortions between 1-10 dB, the input power should be kept sufficiently small to both keep the spectral broadening less than a the spectral distance between the signal and distortion (about 6 nm in FIG. 3B-1) and keep the overall bandwidth less than the 3 dB gain bandwidth of the medium. The specific input power level can depend on the fiber dopant, pump conditions, fiber design (core size and fiber length) and laser wavelength and is limited by the same limitations of gain bandwidth and spectral broadening. Different dopants, pump conditions and signal wavelength can change the bandwidth of the amplifier. Different core sizes and fiber lengths can affect the amount of broadening for given input power. For example, for a single mode 6 micron Yb doped fiber of 10 meter in length for a laser wavelegnth at 1030 nm, the input power should be less than 5 Watts at the peak power.

Different output wavelengths can be obtained from the PA CPA by exploiting different rare earth dopants including Er or Er:Yb for wavelengths around 1.55 micron, Yb or Nd for wavelengths around 1.6 micron and Tm or Ho for wavelengths around 2 micron. The active fiber in the parabolic amplifier can also be replaced by a passive fiber with varying dispersion along the length of the fiber.

Tests for the laser in FIG. 2 suggest that an optical bandpass filter can be located in the optical path of the laser pulses between the parabolic optical amplifier 110 and the pre optical amplifier 232 to filter an optical spectrum of the laser pulses and to remove spectral components near an edge of a parabolic spectral shape of the laser pulses. This filtering can reduce a distortion in the amplified stretched parabolic laser pulses output by the pre optical amplifier 232.

Figure 5A:
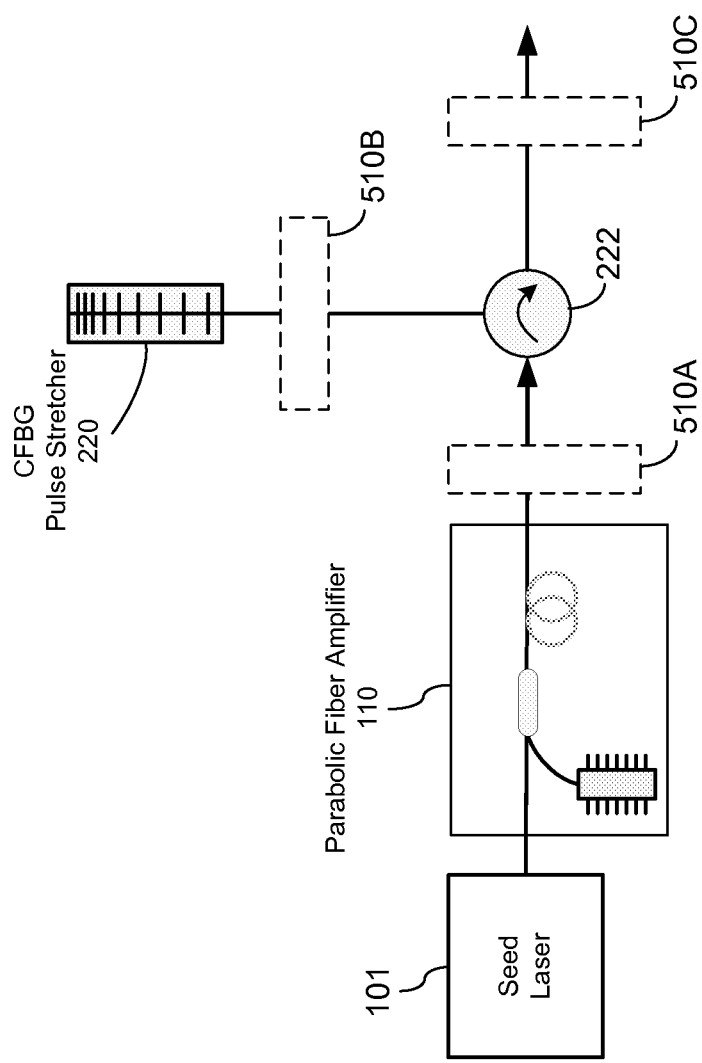
FIG. 5A shows an example of using an optical bandpass filter in the pulsed laser in FIG. 2 to improve the laser pulse quality.

FIG. 5A shows examples of three different locations 510A, 510B and 510C for placing this optical bandpass filter. A convenient way to implement this filter is to integrate this with the CFBG 220 by designing the CFBG 220 to have a reflection bandwidth equal to the required filter bandwidth. The use of such a filter can eliminate distortions in the spectrum that typically occur near the edges of the output spectrum of the signal from the parabolic amplifier. Other types of optical filters such as multi-layer dielectric filters, fiber based filters can be used as well and can be placed between the CFBG and the optical circulator.

Figure 5B:
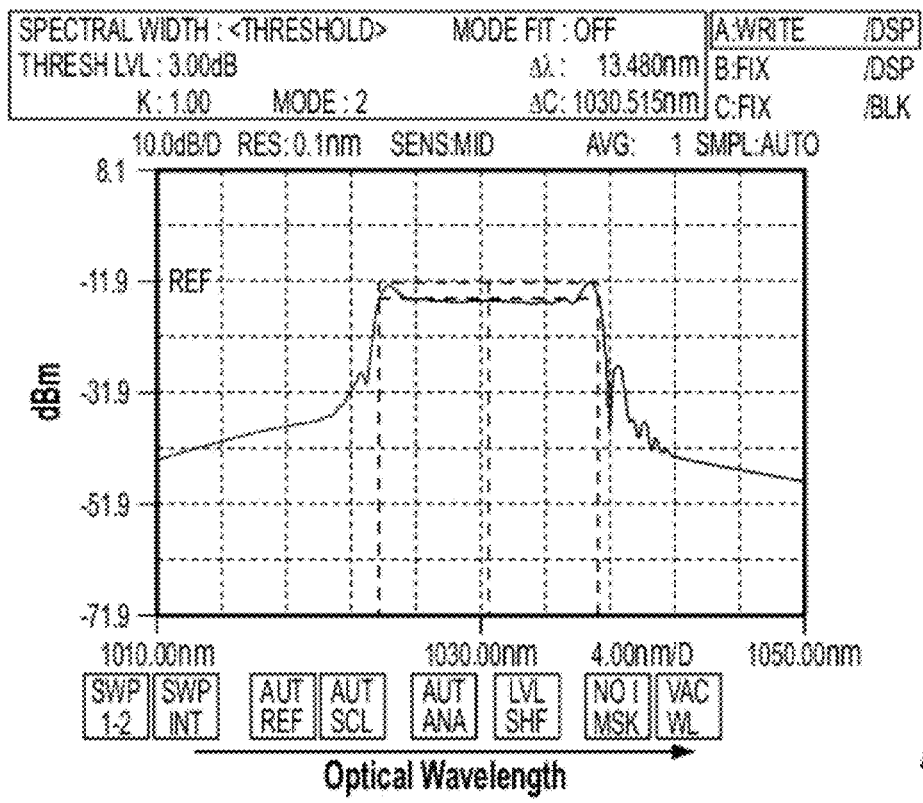
FIGS. 5B and 5C show exemplary measurements illustrating effects of the optical bandpass filter.
Figure 5C:
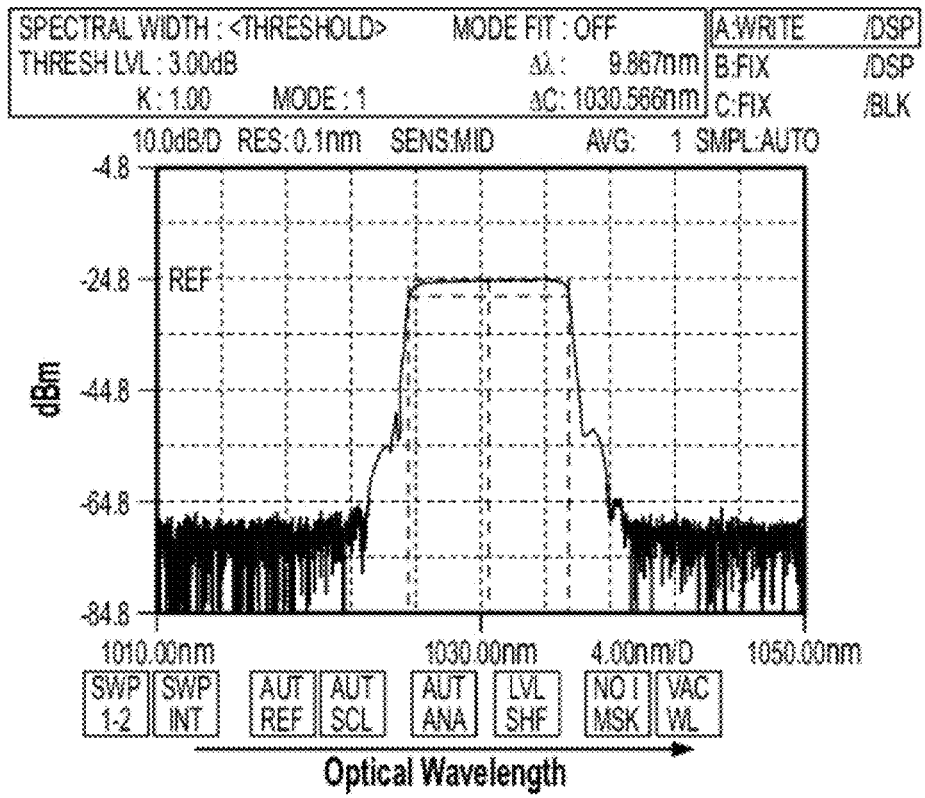

The effects of using a filter are illustrated in FIGS. 5B and 5C. FIG. 5B shows the output spectrum from the parabolic amplifier without the filter after the amplifier or stretcher. FIG. 5C shows the output spectrum with the filter. Although the output spectrum is smooth over most of the center of the spectrum, the spectrum shows peaks near the edges of the spectrum. Such amplitude peaks are also fundamentally related to phase distortions in this part of the spectrum. As a result of these phase distortions, the energy in the distorted edges of the spectrum will not compress properly and result in pulse distortions after compression. Passing the output from the parabolic amplifier through an optical band filter removes the phase distortions at the edges.

In addition to a CFBG stretcher, other types of pulse stretchers can be used as well. For example, the output light from the parabolic amplifier is passed through a length of dispersive fiber as the fiber stretcher, possibly after an attenuator to attenuate the light prior to the fiber stretcher. This may be a fiber specially designed for high dispersion. In this case no optical circulator is needed although the fiber stretcher could also be configured similar to the CFBG if a reflector is provided at the end of the fiber. The advantage of the CFBG is that it is much shorter and has less issue with possible pulse distortions of the pulse in a very long fiber. Other types of stretchers such as a bulk grating stretcher may be used as well.

If proper care is taken with the input power and spectral purity of the seed input signal to a practical parabolic amplifier, the combination of the seed laser and the parabolic amplifier can be used to achieve several benefits over a configuration without a parabolic amplifier. For example, in the parabolic amplifier, the spectrum broadens while adding a linear chirp. As a result the input pulse becomes much wider than the compressed output pulse. This allows pulsed seed lasers with long pulse durations to be used. For another example, the wide spectrum caused by the parabolic amplifier in the pulses makes it easier to stretch the pulses as less dispersion is needed for a wider spectral width pulse to reach the same stretched pulse length. This reduced requirement on the stretching range of the pulse stretch allows less expensive and simpler CFBG stretchers or other stretchers to be used. For another example, the parabolic pulse shape has the benefit of creating SPM distortions in subsequent amplifiers which are correctable by standard grating compressors. For yet another example, as illustrated in FIGS. 4A and 4B, the parabolic amplifier can clean up modest distortions from the seed laser. The output from a practical parabolic amplifier has a pulse profile that is approximately a parabolic profile, and has a broadened spectrum with a linear chirp. The added filter in the present system can be used to achieve operation of a practical parabolic amplifier with non parabolic output shape but linear chirp across the pulse by spectrum filtering the nonlinear chirp from the edge of the output pulse produced by the parabolic amplifier.

The main power amplifier 140 in FIGS. 1 and 2 can be implemented in various configurations. Given a fixed stretched pulse length, nonlinear distortions in the power amplifier ultimately limit the peak power and pulse energy from the PA CPA. The parabolic input shape of the pulse results in nonlinear SPM distortions that may be compensated by the compressor. However the compensation is power dependent and in addition in practice the pulse will be approximate parabolic resulting in phase distortions that may not be compensated. Therefore, it is desirable that the main power amplifier 140 exhibit minimal distortion through SPM.

In implementations, double clad fibers can be used in the final power amplifier 140 as they may be pumped by a large array of multi-mode pump sources and thus the power amplifier easily scales in power. However, non double clad fiber with core pumping may be used as well. Wavelength multiplexing or polarization multiplexing of the pump beams from pump sources and pumping from both end of the fiber could scale power for non double clad fibers. Minimizing the effective interaction length of the pulse in the fiber and maximizing the mode field area can beneficially minimize SPM. This aspect would favor a large fiber core and a high doping density in fibers. Fibers are limited in their core size and dopant concentrations due to various factors. A large core size, e.g., greater than 15-30 microns in diameter, can lead to excitation of higher order modes and thus cause beam distortions and this effect puts a limit on the size of the fiber core. The dopant concentration can be limited by a decrease in efficiency at a high dopant concentration due to clustering of the rare earth atoms or other effects.

Figure 6:
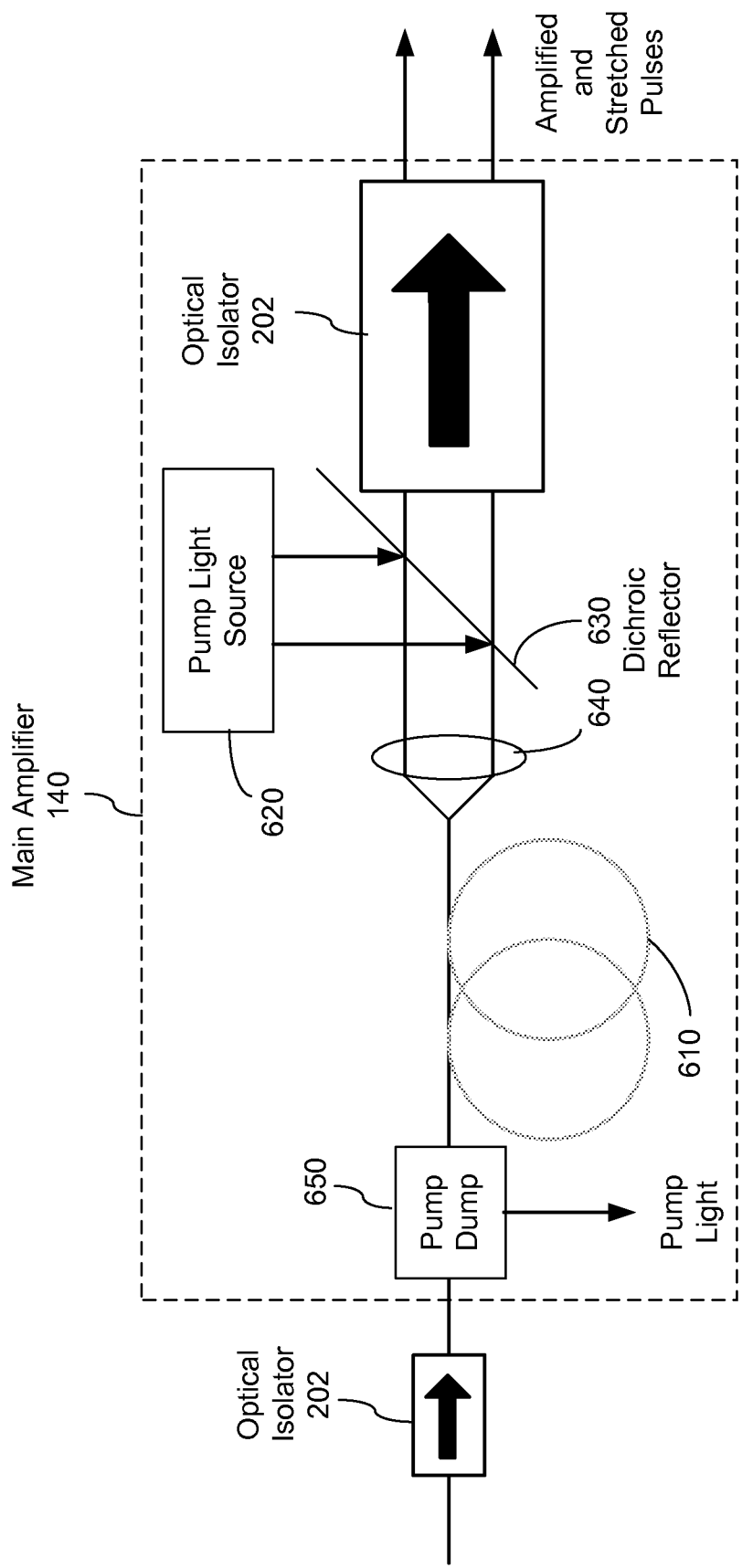
FIGS. 6, 7, 8A and 8B show examples of optical amplifier designs for FIG. 2.

FIG. 6 shows one example of the main amplifier 140. This design includes a fiber gain section 610 doped to produce an optical gain for the laser pulses under optical excitation of optical pump light at a pump wavelength different from a laser wavelength of the laser pulses, a pump light source 620 that produces the optical pump light, a dichroic reflector 630 that receives the optical pump light from the pump light source 620 and reflects the optical pump light towards the fiber gain section 610, a collimator lens 640 that couples the reflected optical pump light from the dichroic reflector 630 into the fiber gain section in a direction opposite to a propagation direction of the laser pulses in the fiber gain section 610, and a pump dump coupler 650 coupled to the fiber gain section 610 at an opposite side of the collimator lens 640 to couple residual pump light out of the fiber gain section 610. The pump dump coupler 650 can be implemented in various configurations depending on the structure of the fiber gain section 610 of the amplifier. For example, for a double clad fiber gain section, the pump dump coupler 650 can be formed by replacing the exterior clad with the same material as the interior clad so that the two fiber cladding layers in the section are formed of the same material to remove the wave confinement by the two fiber cladding layers made of different cladding materials. The laser pulses amplified by the fiber gain section 610 transmit through the dichroic reflector 630 towards the pulse compressor 150.

Figure 7:
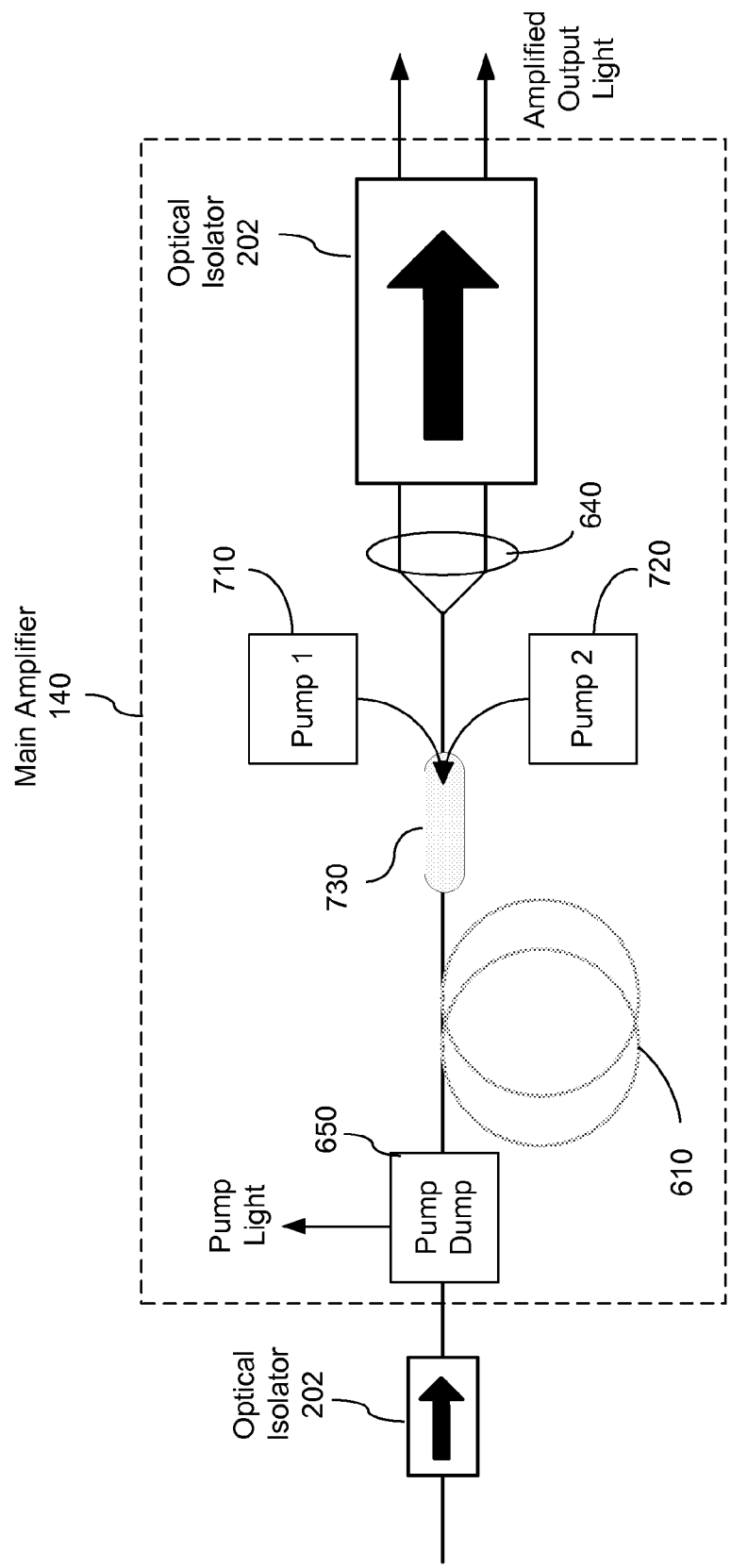

FIG. 7 shows another example of the main amplifier 140 that uses two pump light sources 710 and 720 that produce first and second optical pump beams, respectively. A fused fiber coupler 730 is provided to couple and combine the first and second optical pump beams into the fiber gain section 610 in a direction opposite to a propagation direction of the laser pulses in the fiber gain section 610. A pump dump coupler 650 is coupled to the fiber gain section 610 at an opposite side of the coupler 730 to couple residual pump light out of the fiber gain section 610. A collimator lens 640 couples light of laser pulses out of the fiber gain section 610 and collimates the light through an optical isolator 202 toward the pulse compressor 150.

Given various fiber limitations, the optimal pump, signal and fiber length conditions can substantially increase available pulse energy of the fiber amplifier by decreasing the effective interaction length in the fiber. End pumping of the amplifier tends to produce high pump power near the end of the fiber where the signal is largest and minimizes effects of gain saturation, optimizes the optical gain and minimizes effective interaction length. One drawback of the end pumping is that when pumped with a fused pump combiner, an extra length of fiber is needed to couple the pump light into the fiber via fiber-to-fiber coupling (FIG. 7). This extra fiber length typically 20-30 cm or more can create significant SPM as the output pulse with large energy from the amplifier travels through this fiber pigtail. Alternatively the pumps may be coupled using bulk optics such as a dichroic reflector in a backward pump coupling configuration shown in FIG. 6. The backward pumping can cause strong pump power near the input end of the fiber amplifier. This pump power may be removed with a pump dump around the double clad fiber near the input end of the fiber (as shown in FIGS. 6 and 7).

Figure 8A:
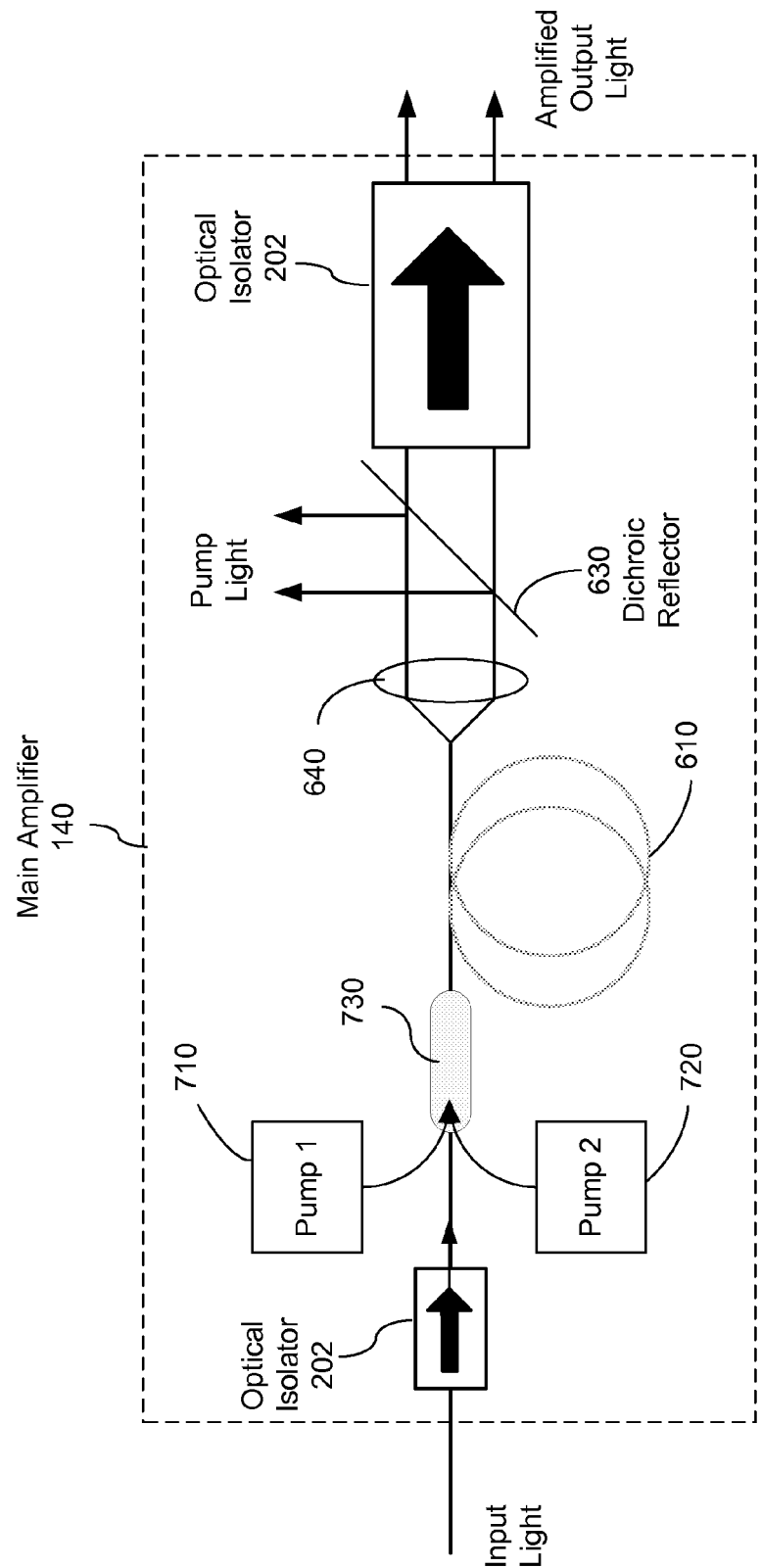

In FIG. 8A, the main optical amplifier is implemented to include two pump lights 710 and 720, a fiber-based coupler 730 that couples and combines the first second optical pump beams into the fiber gain section 610 in a propagation direction of the laser pulses in the fiber gain section 610, and a collimator lens 640 that couples light out of the fiber gain section. A dichroic reflector 630 is used to separate pump light and light of the laser pulses and, in the illustrated example, transmit the laser light while reflecting the pump light. Forward pumping does not have the issue with backward traveling pump light, however care should be taken to have sufficient pump power near the output end of the fiber. Thus the fiber length should be adjusted such that a substantial fraction of the pump light (>10%) leaks from the end of the fiber. The pump light emitted from the output of the fiber may damage the isolator or other components following the output of the amplifier. This pump output power can be relatively easy to be removed as compared to backward pumping. In addition, the optical components at the output end of the amplifier can be designed to handle higher power levels as compared to the components near the input end of the amplifier. A simple spatial filter before the collimation lens can also be used for blocking the pump light, since the pump NA is typically much higher as compared to the laser NA.

Figure 8B:
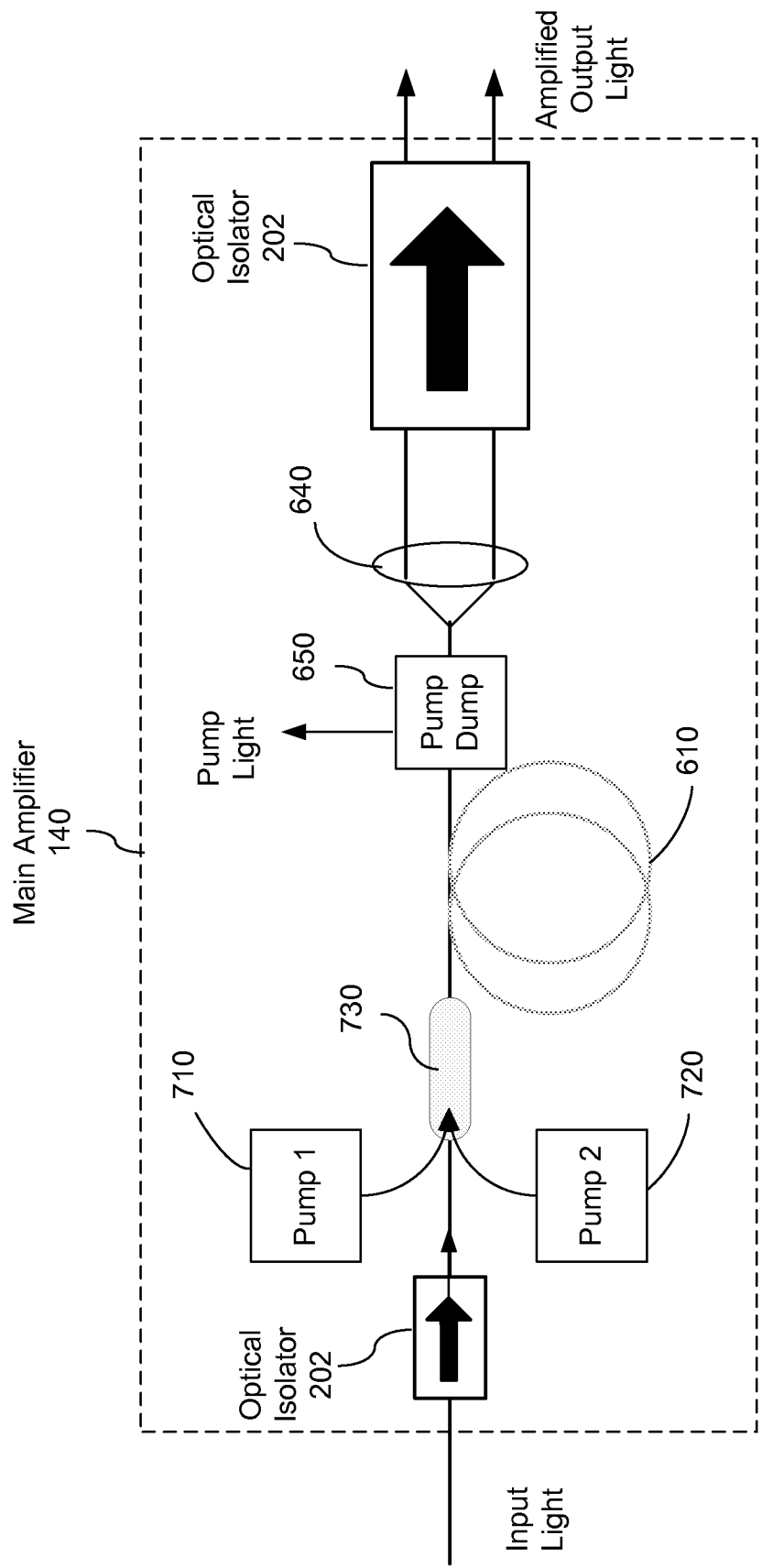

FIG. 8B shows another example of a forward pump design where the main power amplifier in FIG. 8A can be modified by removing the dichroic reflector 630 and by adding a pump light coupler 650 at the output end of the fiber gain section 610 near the lens 640. This pump light coupler 650 or a pump dump is used to couple pump light out of the fiber so that the light that is coupled by the lens 640 out of the fiber gain section 610 is the light of amplified laser pulses. In this configuration the laser is forward pumped with a robust fused pump coupler 730 and the output pump light is removed with the pump dump 650 near the end of the fiber. The signal power can be adjusted to achieve a 35 dB gain or beyond within a fixed maximum available pump power. The high gain can reduce the interaction length. Furthermore the amplifier is adjusted for the minimum length to support the gain. Having a longer amplifier will increase the effective fiber length. Making the fiber shorter no longer permits >35 dB gain as the gain per unit length is limited by the fiber and pump. For example, a Yb double clad fiber with 25 micron in core diameter and 10 dB/m in pump absorption operated at 1030 nm can have a fiber length of approximately 1 meter.

Operating the fiber beyond a 35 dB gain as opposed to typical lower gain (e.g., a 20 dB gain) in such amplifiers can be achieved by using several amplifier features. At the high gain, the amplified spontaneous emission (ASE) can be significant and can reach its peak in the backward direction where it could damage the isolator or have sufficient power to inject the ASE into the pre-amplifiers which would create instabilities in this amplifier. Input and output isolators should have high isolation, e.g., greater than 30 dB isolation. The high gain can also cause self lasing and the sum of all reflections from both ends of the cavity should be less than the gain. The reflections may include reflections from the input isolator, fiber end faces and output optics. To minimize ASE, the laser can be operated at a wavelength near the gain peak. For instance in Yb doped amplifiers, the gain peak in short highly pumped amplifiers is near 1030 nm. Operating at this wavelength ensures that the ASE does not see higher gain than the signal. In addition to these precautions in optical design, the input power and ASE power can be monitored and used to control the laser in case of optical instabilities.

Figure 9:
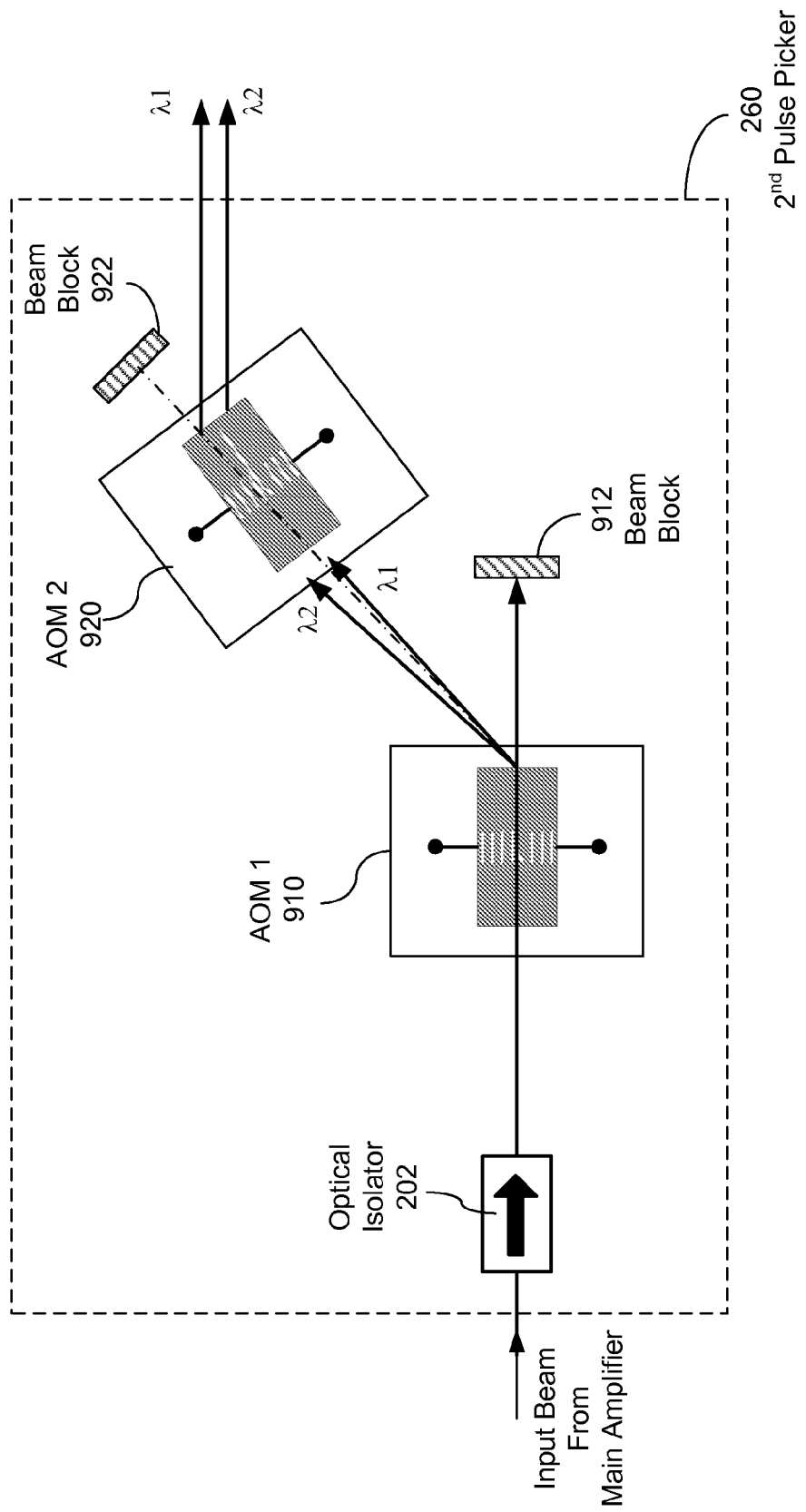
FIGS. 9, 10 and 11 show examples of a pulse picking device suitable for use in the pulsed laser in FIG. 2.
Figure 10:
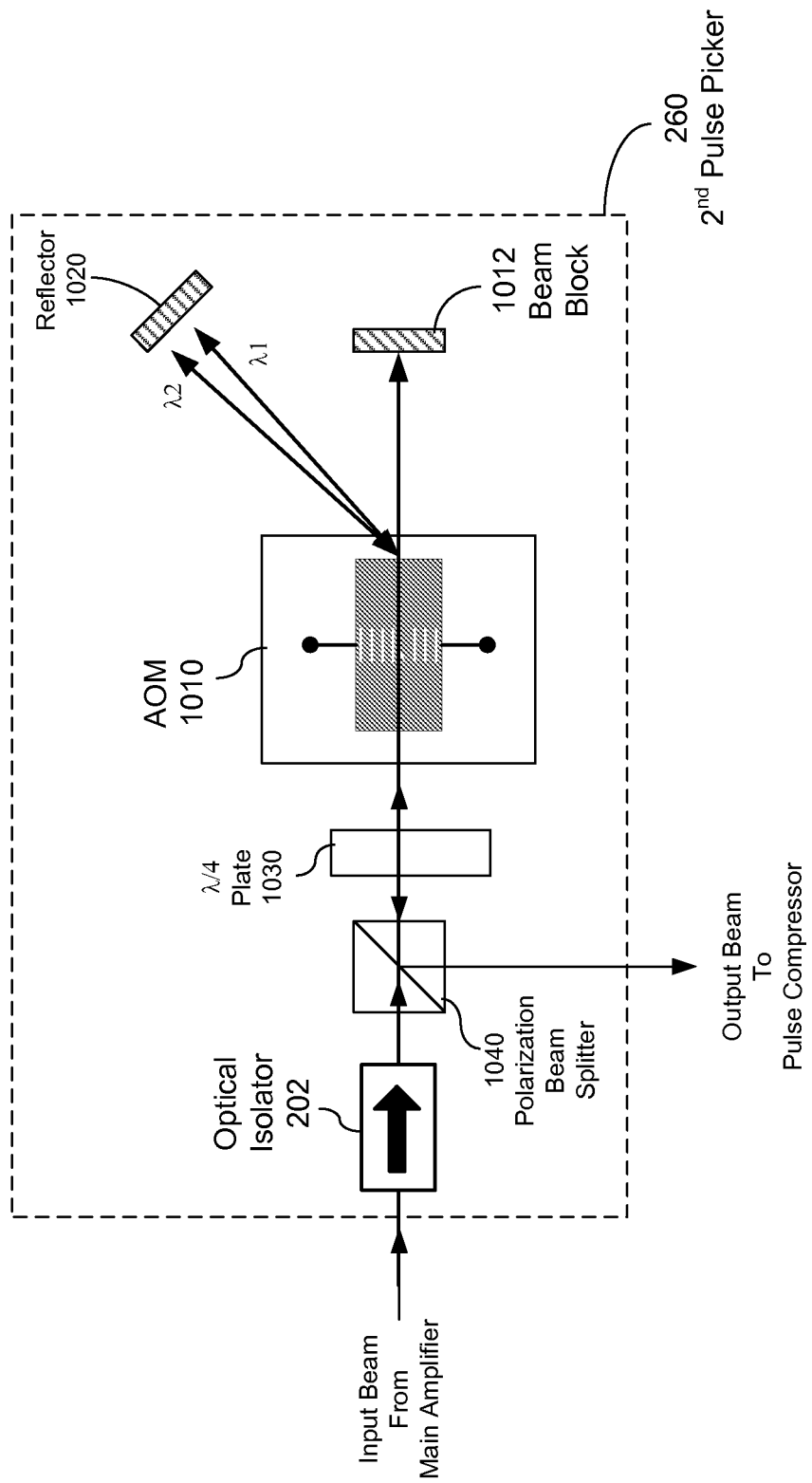
Figure 11:
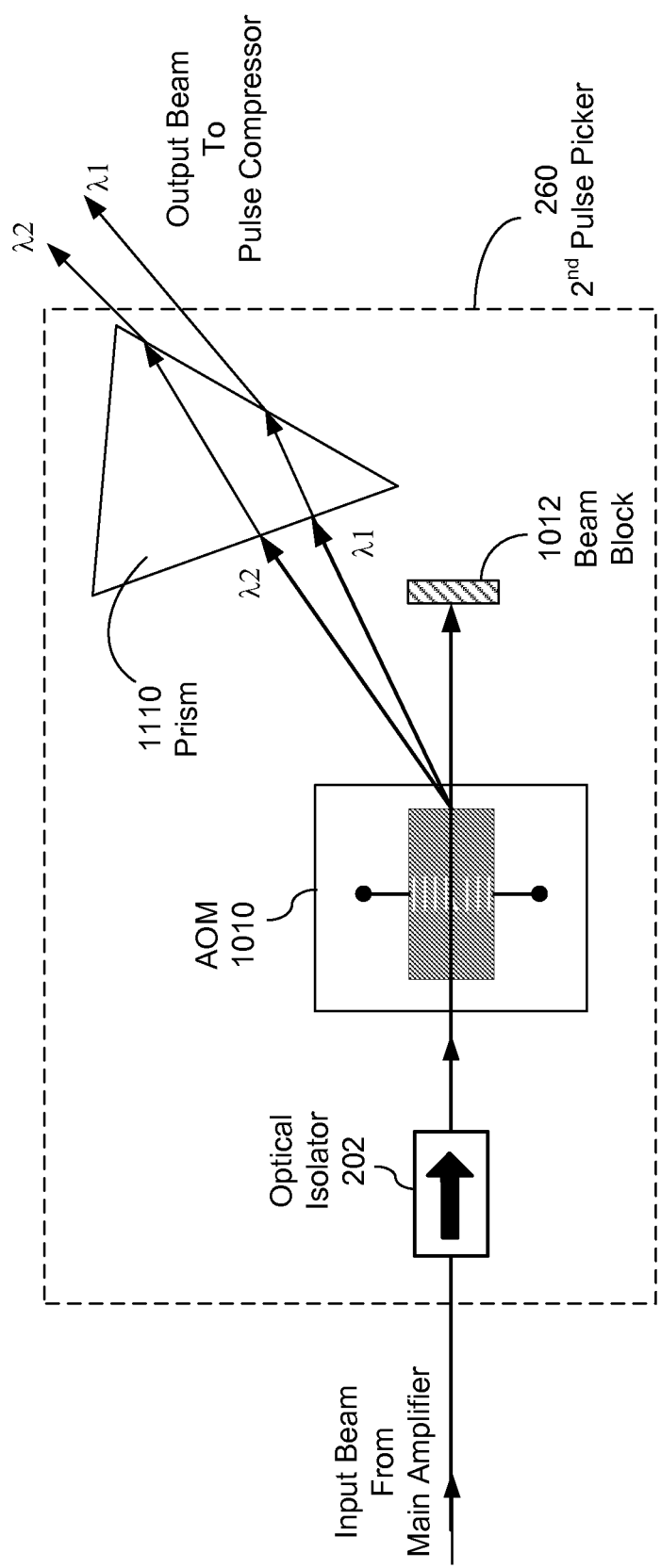

The pulse picking device, e.g., the device 234 or 260 in FIG. 2, can be implemented in various configurations. FIGS. 9, 10 and 11 show three examples of the pulse picking device 260.

In FIG. 9, the second pulse picking device 260 includes a first acousto-optic modulator 910 that receives input light to produce a diffraction beam along a direction different from a direction of the input light, and a second acousto-optic modulator 920 that receives the diffraction beam from the first acousto-optic modulator to produce an output diffraction beam along a direction different from a direction of the diffraction beam between the first and second acousto-optic modulators 910 and 920. The output diffraction beam is directed into the pulse compressor 150 to produce the amplified and compressed output laser pulses.

In FIG. 10, the second pulse picking device 260 includes a polarization beam splitter 1040 that receives input light from the main optical amplifier 140, an acousto-optic modulator 1010 that receives the input light from the polarization beam splitter 1040 to produce a diffraction beam along a direction different from a direction of the input light, and a reflector 1020 located to reflect the diffraction beam to pass through the acousto-optic modulator 1010 again, and a quarter waveplate 1030 located between the polarization beam splitter 1040 and the acousto-optic modulator 1010. The reflected diffraction beam, after passing through the acousto-optic modulator 1010 and the quarter waveplate 1030, is reflected by the polarization beam splitter 1040 into the pulse compressor 150.

FIG. 11 shows another design where an acousto-optic modulator 1010 receives input light to produce a diffraction beam along a direction different from a direction of the input light, and a prism 1110 is located to receive the diffraction beam to produce output light. Because of the operation by the AOM 1010, the pulse repetition rate of the amplified stretched parabolic laser pulses in the output light has a desired output pulse repetition rate less than a pulse repetition rate of the input light received by the acousto-optic modulator 1010. The output from the AOM 1010 is passed through the prism 1110 to correct for the angular distortion without any additional substantial losses. To minimize beam distortions due to beam walk off between different wavelengths the distance between the AOM 1010 and prism 1110 should be as small as possible. To minimize beam distortions in the prism 1110, the apex angle of the prism 1110 should be carefully and the prism 1110 should be oriented such that the diffraction angles on the light with respect to the prism 1110 are approximately the same on both ends of the prism 1110.

Different from the pulse picker design in FIG. 9, the pulse picker in FIG. 11 uses a single optical modulator 1010 to direct the amplified and stretched pulses through the optical modulator 1010 once to achieve the desired pulse picking operation in connection with the prism 1110. The single optical modulator design in FIG. 11 is less costly than the design in FIG. 9 and has reduced optical loss in comparison the optical losses in the two AO modulators in FIG. 9. The physical size of the design in FIG. 11 can be much smaller than the design in FIG. 9 due to the simplicity of the construction. The design in FIG. 10 uses the reflector 1020 to reflect the light back to the AO modulator 1010 for the second time and thus double the optical loss in the design in FIG. 11. The combination of the single optical modulator 1010 and the prism 1110 in the pulse picker design in FIG. 11 provides a structurally simple and compact pulse picker device to minimize the optical loss of valuable optical energy in the amplified and stretched laser pulses after multiple stages of processing.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made.

What is claimed is:

1. A method for amplifying laser pulses, comprising:
   operating an input optical amplifier to amplify input laser pulses to produce laser pulses that have a linear chirp in frequency and are stretched to have a pulse duration longer than a pulse duration of each input laser pulse;
   operating an optical pulse stretcher down stream from the initial optical amplifier to further stretch durations of the laser pulses to produce stretched laser pulses that have a reduced peak power in each laser pulse;
   directing the stretched laser pulses into an optical amplifier to amplify the stretched laser pulses to produce amplified stretched laser pulses;
   compressing a pulse duration of each of amplified stretched laser pulses to produce amplified and compressed output laser pulses with a high peak power;

operating an optical pre-amplifier located between the optical pulse stretcher and the optical amplifier to amplify each stretched laser pulse output by the optical pulse stretcher prior to amplification by the optical amplifier;

before directing laser pulses output by the pre optical amplifier into the optical amplifier, reducing a pulse repetition rate of the laser pulses; and maintaining the reduced pulse repetition rate higher than a threshold pulse repetition rate to reduce an instability in the optical amplifier or to reduce amplified spontaneous emission in the optical amplifier.

2. The method as in claim 1, comprising:

further reducing the reduced pulse repetition rate of the amplified stretched laser pulses, prior to compressing the laser pulses, to a desired output pulse repetition rate; and subsequently, performing the compressing of the duration of each pulse to produce the amplified and compressed output laser pulses at the desired output pulse repetition rate.

3. The method as in claim 1, comprising:

filtering an optical spectrum of the laser pulses at a location downstream from the optical pulse stretcher and upstream from the optical amplifier to reduce a distortion in the laser pulses.

4. The method as in claim 1, comprising:

before directing laser pulses into the optical amplifier, reducing a pulse repetition rate of the laser pulses.

5. The method as in claim 4, comprising:

maintaining the reduced pulse repetition rate higher than a threshold pulse repetition rate to reduce an instability in the optical amplifier or to reduce amplified spontaneous emission in the optical amplifier.

6. The method as in claim 1, comprising:

further reducing the reduced pulse repetition rate of the amplified stretched laser pulses, prior to compressing the laser pulses, to a desired output pulse repetition rate; and subsequently, performing the compressing of the duration of each pulse to produce the amplified and compressed output laser pulses at the desired output pulse repetition rate.

7. The method as in claim 1, comprising:

filtering an optical spectrum of the laser pulses at a location downstream from the optical pulse stretcher and upstream from the optical amplifier to reduce a distortion in the laser pulses.

8. The method as in claim 1, comprising:

controlling the input laser pulses at a location prior to the initial optical amplifier to have spectral distortions less than 10 dB.

9. The method as in claim 1, comprising:

operating the optical pulse stretcher to stretch a duration of each pulse by a factor of 10 or more to produce the stretched laser pulses.

10. The method as in claim 1, wherein:

the amplified and compressed output laser pulses have a pulse energy greater than 10 micro joules.

11. The method as in claim 1, wherein:

the amplified and compressed output laser pulses have a pulse duration less than 10 picoseconds.

12. The method as in claim 1, comprising:

keeping a fiber length of a fiber amplifier as the optical amplifier to be sufficiently short to reduce nonlinear distortions in the optical amplifier.

13. The method as in claim 1, wherein:

configuring the optical amplifier to have an optical gain greater than 35 dB.

14. The method as in claim 1, wherein:

the initial optical amplifier is a parabolic optical amplifier, and the laser pulses output by the initial optical amplifier have a parabolic pulse shape in time.

15. A pulsed laser device, comprising:

a pulsed seed laser that produces input laser pulses;

an initial optical amplifier that receives the input laser pulses to amplify the received input laser pulses to produce laser pulses that have a linear chirp in frequency and a pulse duration longer than a pulse duration of each input laser pulse;

an optical pulse stretcher located down stream from the initial optical amplifier to further stretch durations of the laser pulses to produce stretched laser pulses that have a reduced peak power;

an optical amplifier to further amplify the stretched laser pulses to produce amplified stretched laser pulses;

a pulse compressor that compresses a pulse duration of each pulse in the amplified stretched laser pulses to produce amplified and compressed output laser pulses with a high peak power; and a pulse picking device located upstream from the optical amplifier to reduce a pulse repetition rate of the stretched optical pulses, wherein the pulse picking device controls the reduced pulse repetition rate of the stretched optical pulses to be greater than a threshold pulse repetition rate above which an instability or amplified spontaneous emission in the optical amplifier is reduced.

16. The device as in claim 15, wherein:

the pulse stretcher includes a chirped fiber Bragg gating that stretches the laser pulses.

17. The device as in claim 16, wherein:

the chirped fiber Bragg grating is structured to, in addition to stretching the laser pulses, perform optical filtering of an optical spectrum of the laser pulses to reduce a distortion in the stretched laser pulses.

18. The device as in claim 17, wherein:

the chirped fiber Bragg grating is structured to remove spectral components near an edge of a spectral shape of the laser pulses.

19. The device as in claim 15, comprising:

an optical bandpass filter located in an optical path of the laser pulses between the initial optical amplifier and the optical amplifier to filter an optical spectrum of the laser pulses to reduce a distortion in the laser pulses prior to entering the optical amplifier.

20. The device as in claim 15, comprising:

a second pulse picking device located between the optical amplifier and the pulse compressor to further reduce the pulse repetition rate of the amplified stretched laser pulses to a desired output pulse repetition rate.

21. The device as in claim 20, wherein:

the second pulse picking device includes an acousto-optic modulator that receives input light to produce a diffraction beam along a direction different from a direction of the input light, and a prism located to receive the diffraction beam to produce output light.

22. The device as in claim 15, wherein:

the optical amplifier includes a fiber gain section doped to produce an optical gain for the laser pulses under optical excitation of optical pump light at a pump wavelength different from a laser wavelength of the laser pulses, a coupler that couples pump light into the fiber gain section in a propagation direction of the laser pulses in the fiber gain section, a collimator lens that couples light out of the fiber gain section, and a pump dump coupled to one side of the fiber gain section that is close to the collimator lens to separate the pump light from the light of the laser pulses.

23. The device as in claim 15, wherein:
the optical amplifier includes a fiber gain section doped to produce an optical gain for the laser pulses under optical excitation of optical pump light at a pump wavelength different from a laser wavelength of the laser pulses, a coupler that couples pump light into the fiber gain section in a propagation direction of the laser pulses in the fiber gain section, a collimator lens that couples light out of the fiber gain section, and a dichroic reflector that separates pump light and light of the laser pulses.

24. The device as in claim 15, wherein:
the optical amplifier includes a fiber gain section doped to produce an optical gain for the laser pulses under optical excitation of optical pump light at a pump wavelength different from a laser wavelength of the laser pulses, a coupler that couples pump light into the fiber gain section in a direction opposite to a propagation direction of the laser pulses in the fiber gain section, a pump dump coupler coupled to the fiber gain section at an opposite side of the coupler to couple residual pump light out of the fiber gain section, a collimator lens that couples light of laser pulses out of the fiber gain section and collimates the light toward the pulse compressor.

25. The device as in claim 15, wherein:
the optical amplifier includes a fiber gain section doped to produce an optical gain for the laser pulses under optical excitation of optical pump light at a pump wavelength different from a laser wavelength of the laser pulses, a pump light source that produces the optical pump light, a dichroic reflector that receives the optical pump light from the pump light source and reflects the optical pump light towards the fiber gain section, a collimator lens that couples the reflected optical pump light from the dichroic reflector into the fiber gain section in a direction opposite to a propagation direction of the laser pulses in the fiber gain section, and a pump dump coupler coupled to the fiber gain section at an opposite side of the collimator lens to couple residual pump light out of the fiber gain section, wherein the laser pulses amplified by the fiber gain section transmit through the dichroic reflector towards the pulse compressor.

26. The device as in claim 15, comprising:
a pre optical amplifier located between the optical pulse stretcher and the optical amplifier.

27. A pulsed laser device, comprising:
a pulsed seed laser that produces input laser pulses;
an optical pulse stretcher located down stream from the seed laser to stretch durations of the laser pulses originated from the input laser pulses to produce stretched laser pulses that have a reduced peak power;
an optical amplifier located down stream from the optical pulse stretcher to receive the stretched laser pulses and to amplify the stretched laser pulses to produce amplified stretched laser pulses;
a pulse compressor that is located down stream from the optical amplifier and compresses a pulse duration of each received laser pulse to produce a compressed laser pulse with a high peak power; and
a pulse picking device located between the optical pulse stretcher and the pulse compressor and to reduce a pulse repetition rate of received laser pulses, the pulse picking device including an acousto-optic modulator that receives input light to produce a diffraction beam along a direction different from a direction of the input light, and a prism located to receive the diffraction beam to produce output light by correcting an angular beam distortion and by reducing an optical loss in the produced output light output by the prism.

28. The device as in claim 27, wherein:
the pulse picking device is located between the optical amplifier and the pulse compressor.

29. The device as in claim 27, wherein:
the pulse picking device is located between the optical pulse stretcher and the optical amplifier.

30. The device as in claim 27, comprising:
a second optical amplifier located between the optical amplifier and the pulse compressor to provide additional amplification of each laser pulse.

31. The device as in claim 30, wherein:
the pulse picking device is located between the optical amplifier and the second optical amplifier.

32. The device as in claim 27, comprising:
an optical parabolic amplifier between the seed laser and the optical pulse stretcher, the optical parabolic amplifier amplifying the input laser pulses to produce parabolic laser pulses that have a parabolic pulse and spectral shape and are stretched to have a pulse duration longer than a pulse duration of each input laser pulse; and
an optical bandpass filter located in an optical path of the laser pulses between the parabolic optical amplifier and the optical amplifier to filter an optical spectrum of the laser pulses and to remove spectral components near an edge of a parabolic spectral shape of the laser pulses to reduce a distortion in each amplified stretched laser pulse output by the optical amplifier.

33. The device as in claim 27, wherein the pulse picking device controls the reduced pulse repetition rate of the stretched optical pulses to be greater than a threshold pulse repetition rate above which an instability or amplified spontaneous emission in the optical amplifier is reduced.

* * * * *